United States Patent
Akatsu et al.

(10) Patent No.: US 8,655,696 B2
(45) Date of Patent: Feb. 18, 2014

(54) SYSTEM FOR PERFORMING SCHEDULE MANAGEMENT, SCHEDULE MANAGEMENT METHOD AND PROGRAM

(75) Inventors: Hiroyuki Akatsu, Tokyo (JP); Atsushi Fukuda, Saitama-ken (JP); Takashi Nerome, Kanagawa-ken (JP); Masayuki Numao, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 629 days.

(21) Appl. No.: 12/354,671

(22) Filed: Jan. 15, 2009

(65) Prior Publication Data

US 2009/0192859 A1   Jul. 30, 2009

(30) Foreign Application Priority Data

Jan. 24, 2008 (JP) .................................. 2008-13480

(51) Int. Cl.
  *G06Q 10/00* (2012.01)
  *G06G 1/12* (2006.01)
(52) U.S. Cl.
  USPC .................. 705/7.11; 705/7.21; 705/7.13
(58) Field of Classification Search
  USPC ....................... 705/7.11, 7.21, 7.13
  See application file for complete search history.

(56) References Cited

U.S. PATENT DOCUMENTS

| | | | | |
|---|---|---|---|---|
| 4,019,027 A | * | 4/1977 | Kelley | 235/89 R |
| 4,875,162 A | * | 10/1989 | Ferriter et al. | 705/29 |
| 4,937,743 A | * | 6/1990 | Rassman et al. | 705/7.22 |
| 5,260,866 A | * | 11/1993 | Lisinski et al. | 705/29 |
| 5,293,479 A | * | 3/1994 | Quintero et al. | 715/841 |
| 5,414,843 A | * | 5/1995 | Nakamura et al. | 1/1 |
| 5,563,994 A | * | 10/1996 | Harmon et al. | 345/440 |
| 5,761,063 A | * | 6/1998 | Jannette et al. | 700/97 |
| 5,918,219 A | * | 6/1999 | Isherwood | 705/37 |

(Continued)

FOREIGN PATENT DOCUMENTS

| | | |
|---|---|---|
| JP | 2003-030395 A | 1/2003 |
| JP | 2004-110102 A | 4/2004 |

(Continued)

OTHER PUBLICATIONS

Type of Relationships in UML Modeling, 2005, IBM Corporation Inc. <http://publib.boulder.ibm.com/infocenter/rtnlhelp/v6r0m0/index.jsp?topic=%2Fcom.ibm.xtools.modeler.doc%2Ftopics%2Frreltyp.html>.*

(Continued)

*Primary Examiner* — Ig T An
*Assistant Examiner* — Michael Maicher
(74) *Attorney, Agent, or Firm* — Shimokaji & Assoc., P.C.

(57) ABSTRACT

A system includes a structure information obtaining unit which obtains structure information containing information on components of a development target in a project and on dependency relationships between the components, the structure information described, e.g., in SysML, a work item determining unit which determines work items and a work execution order based on the structure information obtained by the structure information obtaining unit; a detailed item determining unit; a date scheduling unit and a WBS storage which manages the determined work items and work execution order as work schedule definition information. The work item determining unit determines a work item related to a leaf component, which is a component not including any other component, and determines, in a case where all of the multiple components included in a single predetermined component are leaf components, a work item related to a coupling relationship between the leaf components.

17 Claims, 21 Drawing Sheets

(56) References Cited

U.S. PATENT DOCUMENTS

2006/0053043 A1* 3/2006 Clarke .............................. 705/8
2006/0293939 A1* 12/2006 Sun et al. ........................... 705/8
2007/0061154 A1* 3/2007 Markvoort et al. ............... 705/1

FOREIGN PATENT DOCUMENTS

| JP | 20040119102 A | 4/2004 |
| JP | 2005-275989 A | 10/2005 |
| JP | 2007-004327 A | 1/2007 |

OTHER PUBLICATIONS www.sysml.org, Jul. 13, 2003 Courtesy of Way Back Machine <http://web.archive.org/web/20030713152151/http://www.sysml.org/>.*

Types of Relationships in UML Modeling, 2005, IBM Corporation Inc.* www.sysml.org, Jul. 13, 2003 Courtesy of Way Back Machine.*

* cited by examiner

| PHASE NAME | PHASE SEQUENCE NUMBER |
|---|---|
| PHASE A | 1 |
| PHASE B | 2 |
| PHASE C | 3 |

FIG. 3

(A)
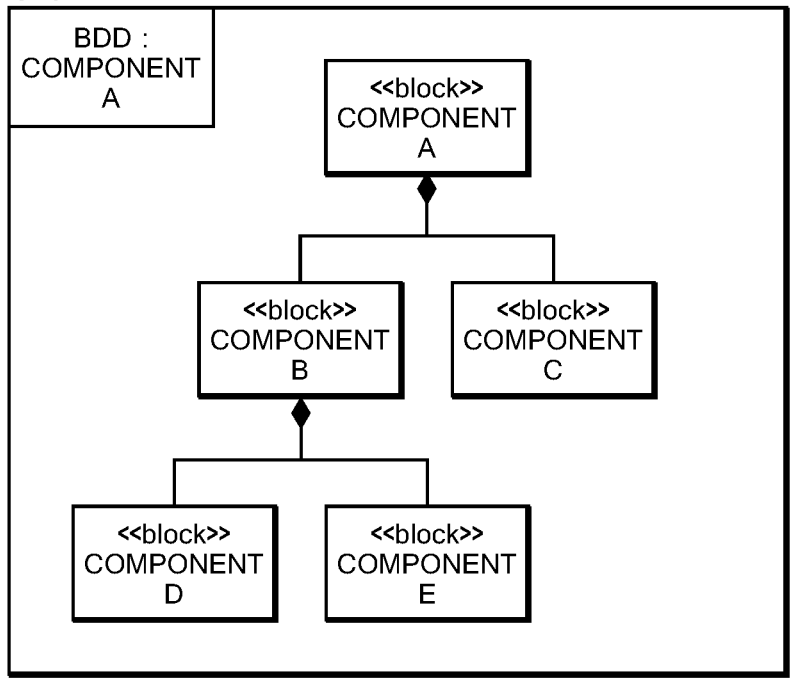
(B)
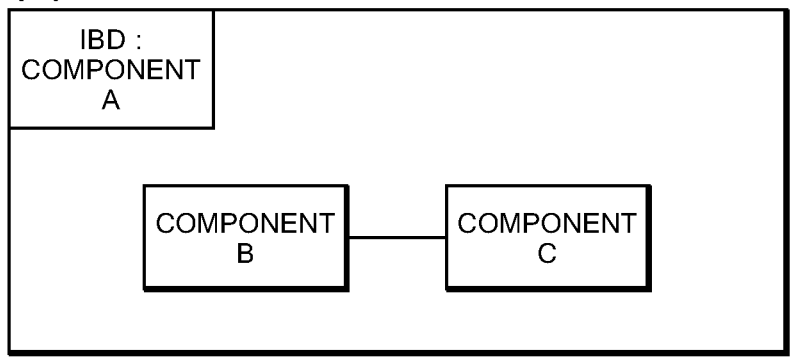
(C)
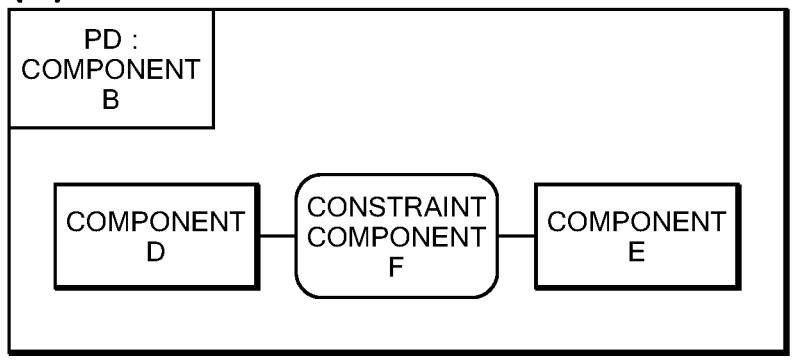
FIG. 4

WORK PATTERN : software

| WORK ITEM NAME | NUMBER OF MAN-HOUR | WORK SEQUENCE NUMBER |
|---|---|---|
| TEST SPECIFICATION CREATION | 5 | 1 |
| UNIT TEST EXECUTION | 3 | 2 |
| SPECIFICATION APPROVAL | 3 | 3 |
| SPECIFICATION APPROVAL | 4 | 4 |

FIG. 5

| PHASE NAME | PHASE SEQUENCE NUMBER |
|---|---|
| DETAIL DESIGN | 1 |
| PROTOTYPE DEVELOPMENT | 2 |
| PROTOTYPE TEST | 3 |

DETAIL DESIGN → PROTOTYPE DEVELOPMENT → PROTOTYPE TEST

FIG. 14

WORK PATTERN :
Software

| WORK ITEM NAME | NUMBER OF MAN-HOUR | WORK SEQUENCE NUMBER |
|---|---|---|
| PROCESSING FUNCTION DESCRIPTION CREATION | 3 | 1 |
| DETAILED IPO CREATION | 3 | 2 |
| DATA CREATION | 1 | 3 |

WORK PATTERN :
Mechanical

| WORK ITEM NAME | NUMBER OF MAN-HOUR | WORK SEQUENCE NUMBER |
|---|---|---|
| CAD DESIGN | 4 | 1 |
| CAM DESIGN | 4 | 2 |
| eBOM CREATION | 3 | 3 |

WORK PATTERN :
Electric

| WORK ITEM NAME | NUMBER OF MAN-HOUR | WORK SEQUENCE NUMBER |
|---|---|---|
| CIRCUIT DESIGN | 4 | 1 |

WORK PATTERN :
partsCombine

| WORK ITEM NAME | NUMBER OF MAN-HOUR | WORK SEQUENCE NUMBER |
|---|---|---|
| COMBINATION DESIGN | 5 | 1 |

WORK PATTERN :
partsCombineWithConstraint

| WORK ITEM NAME | NUMBER OF MAN-HOUR | WORK SEQUENCE NUMBER |
|---|---|---|
| CONSTRAINT ITEM CHECK | 1 | 1 |
| COMBINATION DESIGN | 5 | 2 |

FIG. 15

WORK PATTERN :
Software

| WORK ITEM NAME | NUMBER OF MAN-HOUR | WORK SEQUENCE NUMBER |
|---|---|---|
| SPECIFICATION CHECK | 1 | 1 |
| MOUNTING | 4 | 2 |

WORK PATTERN :
Mechanical

| WORK ITEM NAME | NUMBER OF MAN-HOUR | WORK SEQUENCE NUMBER |
|---|---|---|
| PART PROCUREMENT | 5 | 1 |
| DIMENSION CHECK | 1 | 2 |
| ASSEMBLY | 4 | 3 |

WORK PATTERN :
Electric

| WORK ITEM NAME | NUMBER OF MAN-HOUR | WORK SEQUENCE NUMBER |
|---|---|---|
| SPECIFICATION CHECK | 1 | 1 |
| CIRCUIT MOUNTING | 4 | 2 |

WORK PATTERN :
partsCombine

| WORK ITEM NAME | NUMBER OF MAN-HOUR | WORK SEQUENCE NUMBER |
|---|---|---|
| PART COMBINING | 5 | 1 |

WORK PATTERN :
partsCombineWithConstraint

| WORK ITEM NAME | NUMBER OF MAN-HOUR | WORK SEQUENCE NUMBER |
|---|---|---|
| CONSTRAINT ITEM CHECK | 1 | 1 |
| PART COMBINING | 5 | 2 |

FIG. 16

WORK PATTERN :
Software

| WORK ITEM NAME | NUMBER OF MAN-HOUR | WORK SEQUENCE NUMBER |
|---|---|---|
| TEST SPECIFICATION CREATION | 3 | 1 |
| UNIT TEST EXECUTION | 3 | 2 |
| SPECIFICATION APPROVAL | 1 | 3 |

WORK PATTERN :
Mechanical

| WORK ITEM NAME | NUMBER OF MAN-HOUR | WORK SEQUENCE NUMBER |
|---|---|---|
| TEST SPECIFICATION CREATION | 3 | 1 |
| DURATION TEST EXECUTION | 3 | 2 |
| SPECIFICATION APPROVAL | 1 | 3 |

WORK PATTERN :
Electric

| WORK ITEM NAME | NUMBER OF MAN-HOUR | WORK SEQUENCE NUMBER |
|---|---|---|
| TEST SPECIFICATION CREATION | 3 | 1 |
| BURN-IN TEST EXECUTION | 2 | 2 |
| SPECIFICATION APPROVAL | 1 | 3 |

WORK PATTERN :
partsCombine

| WORK ITEM NAME | NUMBER OF MAN-HOUR | WORK SEQUENCE NUMBER |
|---|---|---|
| TEST SPECIFICATION CREATION | 3 | 1 |
| PART COMBINING TEST EXECUTION | 3 | 2 |
| SPECIFICATION APPROVAL | 1 | 3 |

WORK PATTERN :
partsCombineWithConstraint

| WORK ITEM NAME | NUMBER OF MAN-HOUR | WORK SEQUENCE NUMBER |
|---|---|---|
| CONSTRAINT ITEM CHECK | 1 | 1 |
| TEST SPECIFICATION CREATION | 3 | 2 |
| PART COMBINING TEST EXECUTION | 3 | 3 |
| SPECIFICATION APPROVAL | 1 | 4 |

FIG. 17

| PHASE NAME | PHASE SEQUENCE NUMBER | MIDDLE LEVEL ITEM NAME | RELATED COMPONENT NAME | MIDDLE LEVEL ITEM SEQUENCE NUMBER |
|---|---|---|---|---|
| DETAIL DESIGN | 1 | Configuration file | Configuration file | 1 |
| | | Core module | Core module | 1 |
| | | I/F module | I/F module | 1 |
| | | Optical Receiver | Optical Receiver | 1 |
| | | Lens | Lens | 1 |
| | | ECU | ECU | 1 |
| | | Sensor Attachment | Sensor Attachment | 1 |
| | | Configuration file - Core module | Configuration file - Core module Connector | 2 |
| | | Core module - I/F module | Core module - I/F module | 2 |
| | | Optical Receiver - Lens | Lens size Constraint | 2 |

(MIDDLE LEVEL ITEM spans the last three columns)

FIG. 20

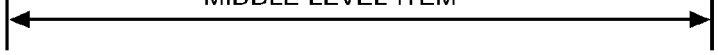

| PHASE NAME | PHASE SEQUENCE NUMBER | MIDDLE LEVEL ITEM NAME | RELATED COMPONENT NAME | MIDDLE LEVEL ITEM SEQUENCE NUMBER |
|---|---|---|---|---|
| DETAIL DESIGN | 1 | Configuration file | Configuration file | 1 |
| | | Core module | Core module | 1 |
| | | I/F module | I/F module | 1 |
| | | Optical Receiver | Optical Receiver | 1 |
| | | Lens | Lens | 1 |
| | | ECU | ECU | 1 |
| | | Sensor Attachment | Sensor Attachment | 1 |
| | | Configuration file - Core module | Configuration file - Core module Connector | 2 |
| | | Core module - I/F module | Core module - I/F module Connector | 2 |
| | | Optical Receiver - Lens | Lens size constraint | 2 |
| | | ECU - Software | ECU - Software Connector | 3 |
| | | Sensor Attachment - IR Sensor | Sensor size Constraint | 3 |
| | | ECU - IR Sensor | Sensor electricity constraint | 3 |

| PHASE NAME | PHASE SEQUENCE NUMBER | MIDDLE LEVEL ITEM NAME | RELATED COMPONENT NAME | MIDDLE LEVEL ITEM SEQUENCE NUMBER | LOWER LEVEL ITEM NAME | LOWER LEVEL ITEM SEQUENCE NUMBER | NUMBER OF MAN-HOUR | ESTIMATED START DATE | ESTIMATED END DATE |
|---|---|---|---|---|---|---|---|---|---|
| DETAIL DESIGN | 1 | Configuration file | Configuration file | 1 | PROCESSING FUNCTION DESCRIPTION CREATION | 1 | 3 | 2007/5/20 | 2007/5/23 |
| | | | | | DETAILED PO CREATION | 2 | 3 | 2007/5/24 | 2007/5/27 |
| | | | | | DATA CREATION | 3 | 1 | 2007/5/28 | 2007/5/29 |
| | | Core module | Core module | 1 | PROCESSING FUNCTION DESCRIPTION CREATION | 1 | 3 | 2007/5/20 | 2007/5/23 |
| | | | | | DETAILED PO CREATION | 2 | 3 | 2007/5/24 | 2007/5/27 |
| | | | | | DATA CREATION | 3 | 1 | 2007/5/28 | 2007/5/29 |
| | | I/F module | I/F module | 1 | PROCESSING FUNCTION DESCRIPTION CREATION | 1 | 3 | 2007/5/20 | 2007/5/24 |
| | | | | | DETAILED PO CREATION | 2 | 3 | 2007/5/24 | 2007/5/29 |
| | | | | | DATA CREATION | 3 | 1 | 2007/5/28 | 2007/6/2 |
| | | Optical Receiver | Optical Receiver | 1 | CAD DESIGN | 1 | 4 | 2007/5/20 | 2007/5/24 |
| | | | | | CAM DESIGN | 2 | 4 | 2007/5/25 | 2007/5/29 |
| | | | | | eBOM CREATION | 3 | 3 | 2007/5/30 | 2007/6/2 |
| | | Lens | Lens | 1 | CAD DESIGN | 1 | 4 | 2007/5/20 | 2007/5/24 |
| | | | | | CAM DESIGN | 2 | 4 | 2007/5/25 | 2007/5/29 |
| | | | | | eBOM CREATION | 3 | 3 | 2007/5/30 | 2007/6/2 |
| | | ECU | ECU | 1 | CIRCUIT DESIGN | 1 | 4 | 2007/5/20 | 2007/5/24 |
| | | Sensor Attachment | Sensor Attachment | 2 | CAD DESIGN | 1 | 4 | 2007/5/20 | 2007/5/24 |
| | | | | | CAM DESIGN | 2 | 4 | 2007/5/25 | 2007/5/29 |
| | | | | | eBOM CREATION | 3 | 3 | 2007/5/30 | 2007/6/2 |
| | | Configuration file - Core module | Configuration file - Core module Connector | 2 | COMBINATION DESIGN | 1 | 5 | 2007/5/30 | 2007/6/4 |
| | | Core module - I/F module | Core module - I/F module Connector | 2 | COMBINATION DESIGN | 1 | 5 | 2007/5/30 | 2007/6/4 |
| | | Optical Receiver - Lens | Lens Size Constraint | 2 | CONSTRAINT ITEM CHECK | 1 | 1 | 2007/6/3 | 2007/6/4 |
| | | | | | COMBINATION DESIGN | 2 | 5 | 2007/6/5 | 2007/6/10 |
| | | ECU - Software | ECU - Software Connector | 3 | COMBINATION DESIGN | 1 | 5 | 2007/6/5 | 2007/6/10 |
| | | Sensor Attachment - IR Sensor | Sensor Size Constraint | 3 | CONSTRAINT ITEM CHECK | 1 | 1 | 2007/6/11 | 2007/6/12 |
| | | | | | COMBINATION DESIGN | 2 | 5 | 2007/6/13 | 2007/6/18 |
| | | ECU - IR Sensor | Sensor Electricity Constraint | 3 | CONSTRAINT ITEM CHECK | 1 | 1 | 2007/6/11 | 2007/6/12 |
| | | | | | COMBINATION DESIGN | 2 | 5 | 2007/6/13 | 2007/6/18 |

SYSTEM FOR PERFORMING SCHEDULE MANAGEMENT, SCHEDULE MANAGEMENT METHOD AND PROGRAM

CROSS REFERENCE TO RELATED APPLICATIONS

This application claims the benefit of Japanese Patent Application No. 2008-13480, filed Jan. 24, 2008, which is incorporated by reference.

BACKGROUND OF THE INVENTION

The present invention relates to a program for causing a computer to perform schedule management of work schedules and the like in a project, and a method and system for such schedule management.

To perform efficient project management, a system and a management method for automatically managing relevant components and work schedules in a project by using a computer can reduce the burden of the project manager. A conventional technique includes a component structure management unit for managing component structure information, a common work breakdown structure (WBS) management unit for managing definitions of a common WBS and rules to be applied in subdividing each item, a WBS specifying unit for automatically specifying the WBS on the basis of the information managed by the component structure management unit and the information managed by the common WBS management unit, and a WBS management unit for managing the specified WBS. In this technique, each project uses the common WBS, and specific work design for each project is automatically generated on the basis of the structure information of the components to be developed.

In project management system development, it is important to appropriately describe dependency relationships between the components of the system to be developed. Especially in work schedule management, appropriate scheduling for each work typically is not possible if the dependency relationships between the components are not clearly described. In a case of developing a complicated system including various components such as hardware and software, it is generally preferable to describe at least three kinds of dependency relationships: an inclusion relationship between the components; a coupling relationship with a constraint between the components; and a coupling relationship without any constraint between the components. In the conventional technique described above, dependency relationships between the components are described only in a single pattern. Accordingly, it is not possible to describe different kinds of dependency relationships, such as an inclusion relationship between the components, or a coupling relationship with a constraint between the components, and a coupling relationship without any constraint between the components, while distinguishing the kinds of dependency relationships from each other. For this reason, efficient project management by appropriately managing components and work schedules cannot be easily performed in a project for developing a complicated system including various components such as hardware and software.

Generally, there has not been any attempt made, in conventional automatic project management techniques to describe these three kinds of dependency relationships in a clearly distinguished manner, and thereby to use the descriptions for management of components and work schedules.

SUMMARY OF THE INVENTION

According to one embodiment of the present invention, a system for performing schedule management in a project, comprises a structure information obtaining unit for obtaining structure information containing both information on components to be developed in the project and information on dependency relationships between the components, the information on dependency relationships containing at least an inclusion relationship and a coupling relationship and a management unit for determining work items and a work execution order on the basis of the structure information obtained by the structure information obtaining unit, and for managing the determined work items and work execution order as work schedule definition information. The management unit determines a work item related to a leaf component, which is a component not including any other component, and determines, in a case where all of a plurality of components included in a single predetermined component are the leaf components, a work item related to a coupling relationship between the leaf components.

According to another embodiment of the present invention, a method of managing a schedule of a project is disclosed, the method comprising obtaining structure information containing both information on components to be developed in the project and information on dependency relationships between the components, the information on dependency relationships containing at least an inclusion relationship and a coupling relationship, determining a work item related to a leaf component, which is a component not including any other component, determining, in a case where all of a plurality of components included in a single predetermined component are the leaf components, a work item related to a coupling relationship between the leaf components and registering information on the determined work items in a data structure having, as registration items at least the work items, the components related to the work items and the work execution order.

According to still another embodiment of the present invention, a computer readable program is disclosed for causing a computer to function as structure information obtaining means for obtaining structure information containing both information on components to be developed in a project and information on dependency relationships between the components, the information on dependency relationships containing at least an inclusion relationship and a coupling relationship and management means for determining a work item and a work execution order on the basis of the structure information obtained by the structure information obtaining means, and for managing the determined work item and work execution order as work schedule definition information. Functions of the management means are to cause the computer to execute processing to: determine a work item related to a leaf component, which is a component not including any other component; and to determine, in a case where all of a plurality of components included in a single predetermined component are the leaf components, a work item related to a coupling relationship between the leaf components.

According to yet another embodiment of the present invention, a computer program product is disclosed, the computer program product comprising a computer usable medium including a computer readable program, wherein the computer readable program when executed on a computer causes the computer to obtain structure information containing both information on components to be developed in the project and information on dependency relationships between the components, the information on dependency relationships containing at least an inclusion relationship and a coupling relationship, determine a work item related to a leaf component, which is a component not including any other component; determine, in a case where all of a plurality of components included in a single predetermined component are the leaf components, a work item related to a coupling relationship between the leaf components; and register information on the determined work items in a data structure having, as registration items at least the work items, the components related to the work items and the work execution order.

These and other features, aspects and advantages of the present invention will become better understood with reference to the following drawings, description and claims.

BRIEF DESCRIPTION OF THE DRAWINGS

FIG. 3 is a table showing a configuration example of a phase template used in the embodiment shown in FIG. 1.

FIGS. 4A to 4C are diagrams showing an example of a structure model of the embodiment, the structure model being described in SysML.

FIG. 5 is a table showing a configuration example of a detailed item template used in the embodiment.

FIG. 14 is a table showing a phase template.

FIG. 15 shows tables, each showing a detailed item template in a detail design phase.

FIG. 16 shows tables, each showing a detailed item template in a prototype development phase.

FIG. 17 shows tables each showing a detailed item template in a prototype test phase.

FIG. 20 is a table showing a state of the WBS into which information on middle level items is set in a second processing cycle.

FIG. 21 is a table showing a state of the WBS into which information on middle level items is set in a third processing cycle.

FIG. 22 is a table showing a state of the WBS into which information on lower level items, estimated start dates and estimated end dates are set.

DETAILED DESCRIPTION OF THE INVENTION

Figure 1:
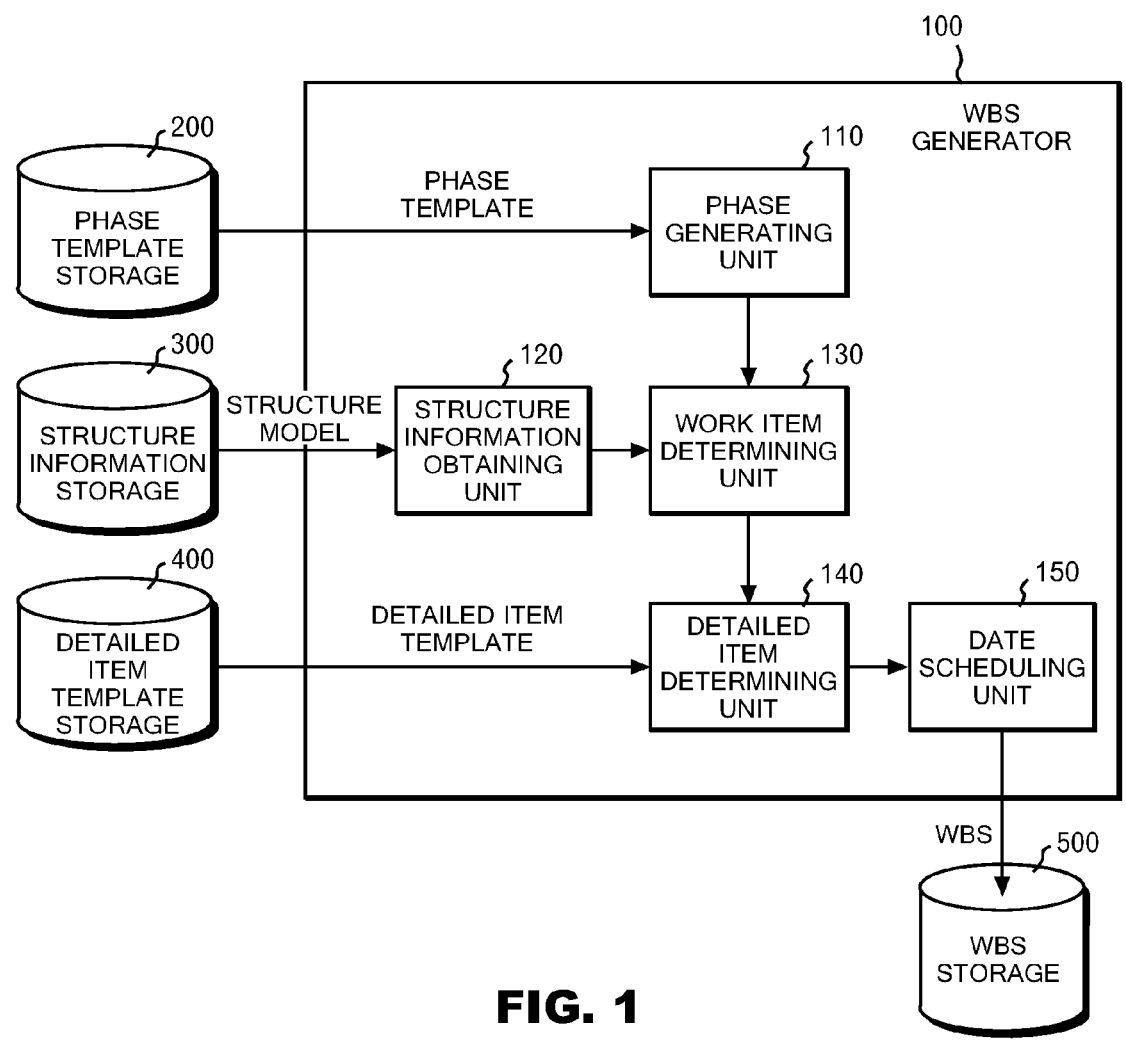
FIG. 1 is a diagram showing a configuration of a schedule management system according to an embodiment.

The following detailed description is of the best currently contemplated modes of carrying out the invention. The description is not to be taken in a limiting sense, but is made merely for the purpose of illustrating the general principles of the invention, since the scope of the invention is best defined by the appended claims.

However, the following embodiments are not intended to limit the present invention according to claims, and all combinations of features described in the embodiment are not necessarily essential to the solving means of the present invention. Note that the same elements are denoted by the same reference numerals throughout the description of the embodiments.

Broadly, embodiments of the present invention enable automatic schedule management of work schedules and the like in projects for developing complicated systems, including various components such as hardware and software. To achieve such automatic schedule management, embodiments may be configured as a system that may include a structure information obtaining unit and a management unit.

The structure information obtaining unit may obtain structure information containing both information on a component to be developed in a project and information on a dependency relationship between the components, the information on a dependency relationship containing at least an inclusion relationship and a coupling relationship.

The management unit may determine a work item and an execution sequence number of the work on the basis of the structure information obtained by the structure information obtaining unit, and which manages the determined work item and execution sequence number as work schedule definition information. Moreover, the management unit may determine a work item related to a leaf component, which may be a component not including any other component, and may also determine, in a case where all multiple components included in a single predetermined component are the leaf components, a work item related to a coupling relationship between the leaf components.

The management unit may determine a work item related to a coupling relationship between multiple components included in a single predetermined component, in a case where part of or all of the multiple components are components in which each includes a component for which a work item related to a coupling relationship is determined, and where no component including a component for which a work item related to a coupling relationship is not determined is included in the multiple components.

Moreover, the management unit may repeat the determination of the work item related to a coupling relationship between the multiple components until a component which is not included in any other component is to be determined.

Furthermore, the structure information obtained by the structure information obtaining unit may include a coupling relationship with a constraint and a coupling relationship without any constraint as the coupling relationship of the information on a dependency relationship. Specifically, the structure information obtained by the structure information obtaining unit may be described in systems modeling language (SysML), described in detail in "OMG SysML Specification"—which may be found at http://www.omg.org/docs/ptc/06-05-04.pdf—and also described in "OMG technique—SysML (OMG Systems Modeling Language)"—which may be found at http://www.otij.org/omginfo/technology/primer/sysml.html. Moreover, of the information on a dependency relationship, the inclusion relationship may be described in the form of a block definition diagram, the coupling relationship with a constraint may be described in the form of an internal block diagram, and the coupling relationship without any constraint may be described in the form of a parametric diagram.

Furthermore, the management unit may generate the definition information by registering information on the determined work item in a data structure in which at least the work item, the component related to the work item and the execution sequence number of the work are items to be registered.

In addition, the system may have a configuration which further includes a definition information obtaining unit which obtains detailed definition information defining a detailed work item to be executed depending on the kind of the component and the kind of the coupling relationship between the components. In this case, the management unit registers the corresponding detailed definition information in the data structure on the basis of the information on the work item and the component registered in the data structure.

Embodiments of the present invention can also be implemented in the form of a method. Moreover, the present invention can also be implemented as a program for implementing the functions of the above-described system using a computer. The program can be provided by distributing a magnetic disk, an optical disk, a semiconductor memory or a different computer readable storage medium in which the program is stored, or delivering the program through a network.

An embodiment of the present invention will be described in detail below with reference to the accompanying drawings. In this embodiment, work schedules are managed in a project of system development in a manner that work items and the execution sequence of the works in the project are determined on the basis of information on the structure model of the system to be developed. In addition, in this embodiment, a work breakdown structure (WBS) may be generated in which the determined work items and execution sequence of the works are registered.

System Configuration

FIG. 1 is a diagram showing a configuration of a schedule management system according to one embodiment.

The schedule management system shown in FIG. 1 includes: a WBS generator 100; a phase template storage 200; a structure information storage 300; a detailed item template storage 400; and a WBS storage 500. Moreover, the WBS generator 100 includes: a phase generating unit 110; a structure information obtaining unit 120; a work item determining unit 130; a detailed item determining unit 140; and a date scheduling unit 150.

Figure 2:
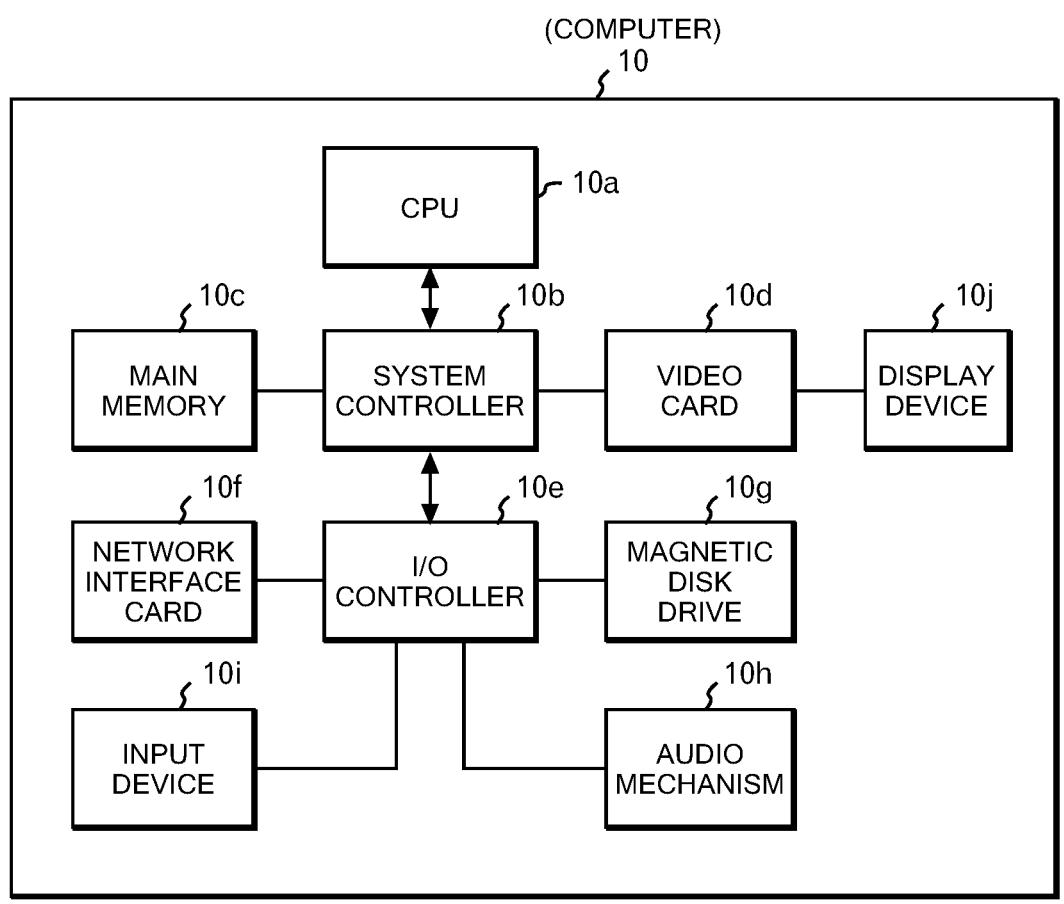
FIG. 2 is a diagram showing an example of a hardware configuration of a computer which implements the schedule management system shown in FIG. 1.

FIG. 2 is a diagram showing an example of a hardware configuration of a computer which implements the schedule management system shown in FIG. 1.

A computer 10 shown in FIG. 2 includes a CPU (central processing unit) 10a, which is computing means, and a main memory 10c and a magnetic disk drive (hard disk drive (HDD)) 10g, which are storage means. The computer 10 also includes a network interface card 10f for connecting the computer 10 to an external device via a network, a video card 10d and a display device 10j for display output, and an audio mechanism 10h for audio output. Moreover, the computer 10 further includes an input device 10i such as a keyboard or a mouse.

As shown in FIG. 2, the main memory 10c and the video card 10d may be each connected to the CPU 10a through a system controller 10b. The network interface card 10f, the magnetic disk drive 10g, the audio mechanism 10h and the input device 10i may be each connected to the system controller 10b through an input/output (I/O) controller 10e. Each of the above-described components may be connected through various busses such as a system bus and an I/O bus. For example, the CPU 10a and the main memory 10c may be connected through a system bus and a memory bus. The CPU 10a and each of the magnetic disk drive 10g, the network interface card 10f, the video card 10d, the audio mechanism 10h, the input device 10i and the like may be connected through an I/O bus such as a peripheral components interconnect (PCI), a PCI Express, a serial AT attachment (ATA), a universal serial bus (USB) and an accelerated graphics port (AGP).

It should be noted that FIG. 2 only shows an example of a computer hardware configuration which is suitable for the application of one embodiment, and it goes without saying that a server to be actually used is not limited to the configuration shown in FIG. 2. For example, a configuration to be employed may be such that image data can be processed by the CPU 10a by providing the computer with only a video memory, instead of the video card 10d. Moreover, instead of the configuration of including the audio mechanism 10h independently, a configuration may also be employed such that the audio mechanism 10h can be included as a function of a chip set composing the system controller 10b and the I/O controller 10e. Furthermore, in addition to the magnetic disk drive 10g, drives employing various optical disks and flexible disks as media may also be provided as auxiliary storage devices. As the display device 10j, a liquid crystal display may be normally used, but any kind of display such as a cathode ray tube (CRT) display or a plasma display may be used instead.

In the case where the schedule management system shown in FIG. 1 is configured by the computer shown in FIG. 2, each function of the WBS generator 100 may be performed in a manner that the CPU 10a executes a program read out from the main memory 10c. Moreover, the phase template storage 200, the structure information storage 300, the detailed item template storage 400 and the WBS storage 500 can be implemented by storage means such as the main memory 10c and the magnetic disk drive 10g.

The phase template storage 200 stores therein a template (definition information) showing execution sequence of each phase (work stage) of a project.

FIG. 3 is a table showing a configuration example of a phase template.

In the phase template shown in FIG. 3, phase names for identifying each phase and phase sequence numbers for showing the execution sequence of each phase may be items to be registered. According to the phase template shown in FIG. 3, the project progresses through three phases, phase A, phase B and phase C, in this order. Various phase templates may be stored in the phase template storage 200 according to the type of the project and the like.

The structure information storage 300 stores therein a structure model which is information on the structure of a system to be developed (hereinbelow, simply referred to as a target system). The structure model contains information on components of the target system and information on dependency relationships between the components. The dependency relationships may be defined to include at least inclusion relationships, coupling relationships without any constraints and coupling relationships with constraints are defined. To describe the above-described kinds of information, the structure model may be described using, for example, systems modeling language (SysML).

FIGS. 4A to 4C are diagrams showing an example of a structure model described using SysML.

FIG. 4A is a block definition diagram showing inclusion relationships between components. In the example shown in FIG. 4A, component A includes component B and component C. Moreover, component B includes component D and component E. FIG. 4B is an internal block diagram showing a coupling relationship between components without any constraint. In the example shown in FIG. 4B, component B and component C are connected with a connector, and have a coupling relationship while no constraint is imposed on the coupling. FIG. 4C is a parametric diagram showing a coupling relationship between components with a constraint. In the example shown in FIG. 4C, component D and component E are connected through constraint component F, and have a coupling relationship with a constraint.

In SysML, a constraint for a coupling relationship between components may also be described as a component (constraint component), as shown in FIG. 4C. For this reason, a stereotype <<metaclass>> is allocated to each of the components described in SysML, so that the components can be distinguished by those properties. In this example, the property of the stereotype <<metaclass>> is set to be "block" for the component corresponding to the components which are the components of the target system (hereinbelow, these components are referred to as block components). In addition, the property of the stereotype <<metaclass>> is set to be "constraint" for the constraint component.

Moreover, a stereotype <<patternApplied>> can be allocated to the components each of which does not include any other components, that is, to the components (leaf structure components) corresponding to leaf nodes, each of which does not have any child in the tree structure in the block definition diagram, the stereotype <<patternApplied>> indicating that a detailed item template to be described later is applied. Properties of the stereotype <<patternApplied>> may be work pattern and WBS registration completion flag. Work pattern is a property for associating the component with the detailed item template, and property values thereof are {Software, Mechanical, Electric}. WBS registration completion flag is a property for showing whether or not information on the component has already been registered in the WBS, and property values thereof may be {True, False}. The property value of the WBS registration completion flag may be initially set to "False."

The detailed item template storage 400 stores therein work items related to the components and the detailed item templates in each of which work items related to the coupling relationships between the components are defined. In each of the detailed item templates, work item names for identifying work items, the numbers of man-hours and the work sequence numbers showing the execution sequence of the works are the items to be registered. The work content varies depending on the components and the types of coupling relationships. Accordingly, the work patterns each representing the relevant work content may be defined, and a detailed item template may be set for each of the work patterns. This means that the detailed item templates each have a specific work item set for each of the work patterns. In addition, the content of each of the detailed item templates varies by phase. In other words, although the work pattern may be the same, the specific work content varies depending on the phases (work stages). Thus, a detailed item template may be prepared for each of the phases and for each of the work patterns.

A property for identifying each of the work patterns is allocated to each of the detailed item templates. In this example, it is assumed that there are five kinds of work patterns, and that possible properties thereof are "Software," "Mechanical," "Electric," "partsCombine" and "partsCombineWithConstraint." Here, the three properties, "Software," "Mechanical" and "Electric," may be the same property values as the work pattern property values for the stereotype <<patternApplied>> allocated to each of the block components described in SysML. Accordingly, by obtaining the work pattern property value from each of the block components described in SysML, the work pattern of the component of the target system corresponding to the block component can be obtained, and the detailed item template corresponding to the component can consequently be specified. Note that, in this example, among the work pattern properties for the detailed item templates, the two properties, "partsCombine" and "partsCombineWithConstraint," are concerned with coupling relationships between components. Accordingly, no property values corresponding to these two property values are included in the work pattern property for the stereotype<<patternApplied>>.

FIG. 5 is a table showing a configuration example of a detailed item template.

The detailed item template shown in FIG. 5 is set to have "Software" as the work pattern property, and describes the works in phase A. In this detailed item template, four work items, AA, BB, CC and DD, are registered, and the works are performed in this order.

The WBS storage 500 stores therein a WBS generated by the WBS generator 100. In this example, a WBS is generated as a data structure in which phases, middle level items corresponding to work items related to the components and work items related to coupling relationships between the components, and lower level items corresponding to the detailed items of the work in each of the middle level items are registered. A detailed description of the WBS will be given later.

The WBS generator 100 reads the structure model of the target system from the structure information storage 300, and generates a WBS to be used for the schedule management, on the basis of the read structure model. Specifically, the WBS generator 100 reads a phase template from the phase template storage 200, and also reads a detailed item template from the detailed item template storage 400. Thereafter, the WBS generator 100 extracts necessary information from the structure model, and then registers the extracted information in the relevant section for the middle level items and lower level items of the WBS generated on the basis of the read templates.

Specifically, the phase generating unit 110 reads the phase template corresponding to the project from the phase template storage 200, and then registers the content of the phase template in the relevant section for the items related to the phases in the data structure of the WBS. The information to be registered includes phase names and phase sequence numbers. Here, the project manager, who is the user of the WBS generator 100, may select the phase template according to the content of the project, and then input the selected phase template into the WBS generator 100. In response to the receipt of this input, the phase generating unit 110 may read the selected phase template from the phase template storage 200.

The structure information obtaining unit 120 reads the structure model of the target system from the structure information storage 300. Then, the structure information obtaining unit 120 transmits, to the work item determining unit 130, information on the structure of the target system, i.e. information on the individual components composing the target system and information on dependency relationships between the components, specifically. In addition, the structure information obtaining unit 120 extracts, from the structure model described in SysML, information on the work pattern property of the stereotype <<patternApplied>> of each of the block components, and then transmits the extracted information to the detailed item determining unit 140.

Based on the information received from the structure information obtaining unit 120, the work item determining unit 130 generates information on work items related to each of the components and information on work items related to coupling relationships between the components, which are then registered in the relevant sections for the corresponding middle level items in the data structure of the WBS. Information to be registered includes the names of the middle level items (middle level item names), the names of the components described in SysML which are related to the middle level items (related component names), and the execution sequence numbers of the work (middle level item sequence numbers). Here, besides the block components and the constraint component, the connectors each indicating a coupling relationship without any constraint are also considered as components. A specific procedure for generating information on work items and registering the information in the WBS will be described later.

The detailed item determining unit 140 specifies a more detailed work content for each of the work items which are the middle level items registered in the WBS by the work item determining unit 130, and then registers the specified work contents in the relevant sections for the lower level items in the data structure of the WBS. Specifically, the detailed item determining unit 140 first reads detailed item templates corresponding to the work patterns of the components from the detailed item template storage 400 on the basis of the information on work pattern properties received from the structure information obtaining unit 120. Thereafter, the detailed item determining unit 140 registers the content of each of the detailed item templates in the relevant sections for lower level items in the WBS. In this example, information to be registered may include the name of the lower level items (lower level item names), the numbers of man-hour required for the individual work, the execution sequence numbers of the work (lower level item sequence numbers). Although the description of the number of man-hour required for the work can employ any unit, the number of days required for the work is employed as the unit in this example.

The date scheduling unit 150 calculates, for each work, an estimated start date and an estimated end date, on the basis of the work item (including the detailed item), the execution sequence number of the work and the number of man-hour, which are registered in the data structure of the WBS by the phase generating unit 110, the work item determining unit 130 and the detailed item determining unit 140. Thereafter, the date scheduling unit 150 registers the calculated estimated start date and estimated end date in the data structure of the WBS. A detailed description of a method of calculating the start date and end date for each work by the date scheduling unit 150 will be described later.

In the schedule management system having the above-described configuration, the phase generating unit 110, the work item determining unit 130, the detailed item determining unit 140 and the date scheduling unit 150, which are each for generating information on the relevant work items, together with the WBS storage 500, which stores therein the generated WBS, function as work schedule management means. Moreover, the detailed item determining unit 140 also functions as definition information obtaining means for obtaining the detailed item templates, each of which is detailed item definition information.

Operations of WBS Generator 100

Next, operations of the WBS generator 100 will be described with reference to a flowchart.

Figure 6:
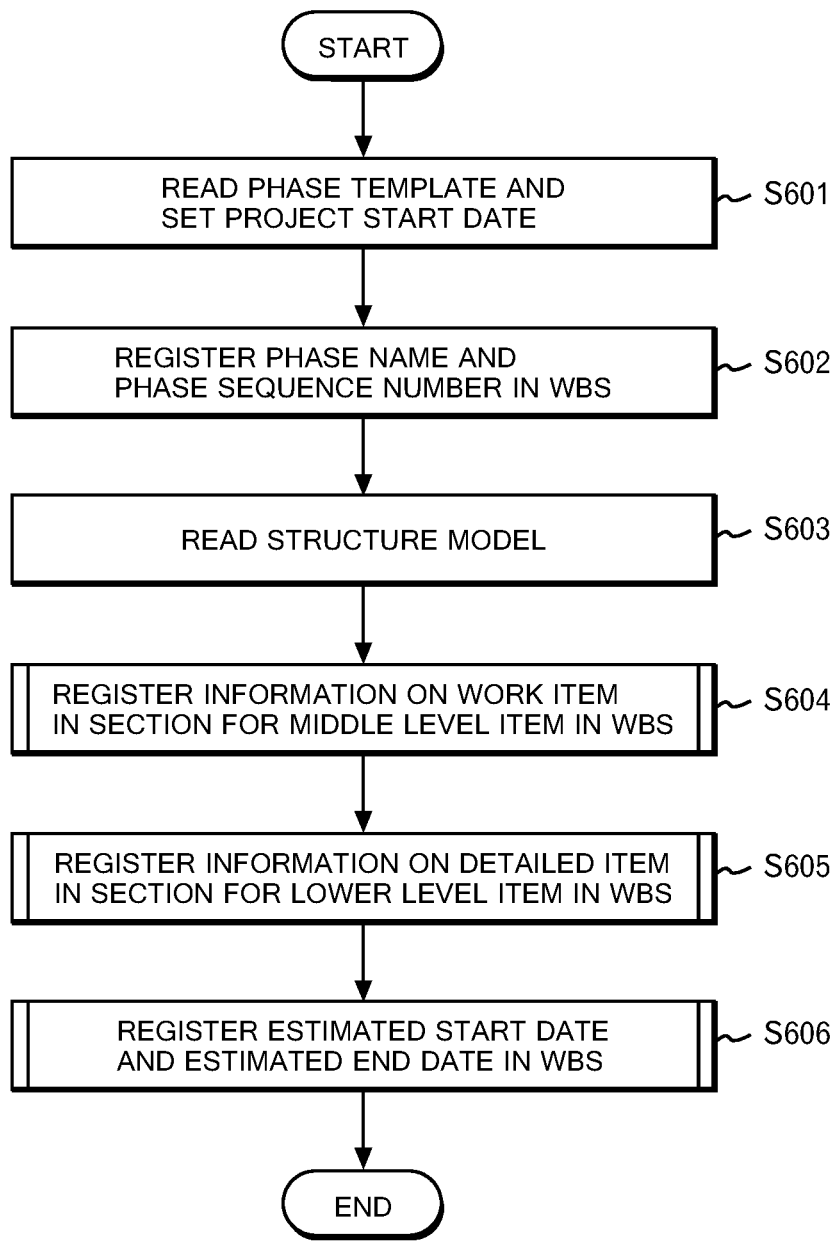
FIG. 6 is a flowchart showing the overall flow of a process for generating a work breakdown structure (WBS) performed by a WBS generator of the embodiment.

FIG. 6 is a flowchart showing the overall flow of processes for generating a WBS performed by the WBS generator 100.

As shown in FIG. 6, the phase generating unit 110 reads, from the phase template storage 200, the phase template selected by the project manager, and accepts the registration of a start date of the project (step 601). Then, the phase generating unit 110 enters the phase name and the phase sequence numbers included in the read phase template, into the relevant sections for phase names and phase sequence numbers in the WBS (step 602).

Thereafter, the structure information obtaining unit 120 reads a structure model of the target system from the structure information storage 300 (step 603). Then, the work item determining unit 130 registers, for each of the work items, information on the structure of the target system obtained from the structure model in the relevant sections (for middle level item names, related component names and middle level item sequence numbers) for middle level items of the WBS (step 604).

Subsequently, the detailed item determining unit 140 reads, for each of the work items of the WBS, a detailed item template in which the work items are further specified on the basis of the work pattern of each of the components, from the detailed item template storage 400. Then, the detailed item determining unit 140 registers the information on each of the read detailed item templates in the relevant sections (for lower level item names, the numbers of man-hour and lower level item sequence numbers) for lower level items of the WBS (step 605).

Thereafter, the date scheduling unit 150 calculates an estimated start date and an estimated end date for each work, on the basis of the execution sequence number of each work item (including the detailed item) and the number of man-hours which are registered in the WBS in the step 605 and therebefore. Then, the date scheduling unit 150 registers the calculated start dates and end dates in the relevant sections in the WBS (step 606). The WBS generated as described above may be output by the WBS generator 100, and then is stored and held by the WBS storage 500.

Figure 7:
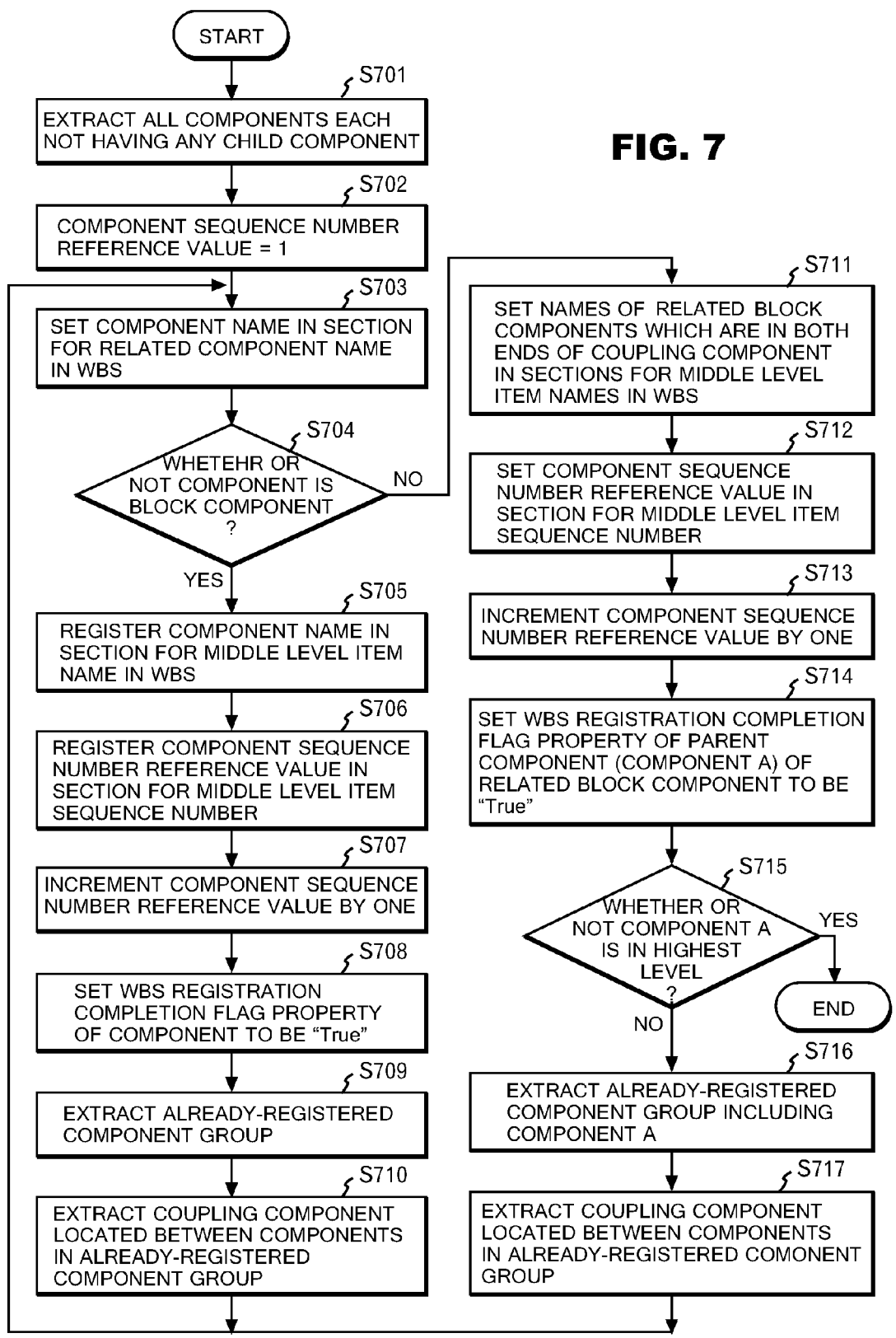
FIG. 7 is a flowchart showing details of processing shown in FIG. 6 performed by a work item determining unit.

FIG. 7 is a flowchart showing the details of the processing in step 604 of FIG. 6 performed by the work item determining unit 130.

As shown in FIG. 7, the work item determining unit 130 extracts, as the component to be processed, all components each of which does not include any different components, from the components of the target system shown in the structure model. In other words, the block components of the leaf nodes, each of which does not have any child in the block definition diagram described in SysML may be extracted (step 701). Then, a reference value to be used for the registration of the execution sequence number of the work may be set to 1 (step 702).

Next, the work item determining unit 130 sets the name of the component to be processed into the section for the related component name in the WBS (step 703), and then determines whether or not the component is a block component (step 704). In the first processing cycle, the block components extracted in step 701 are to be processed, and hence, all the extracted components are determined to be block components in step 704.

In the case where the component is determined to be a block component in step 704, the work item determining unit 130 sets the name of the block component to be processed (block name) into the section for the middle level item name (step 705), and then sets the reference value into the section for the middle level item sequence number (step 706). In the first processing cycle, the reference value may be 1 as set in step 702, and hence, 1 may be set into the section for the middle level item sequence number.

Next, the work item determining unit 130 increments the reference value by one (step 707), and sets the property value of the WBS registration completion flag of the stereotype <<patternApplied>> of the block component to be processed to "True" (step 708). Through the processes from step 705 to step 708, the registration of the information on the middle level items may be completed for the components corresponding to the block components to be processed.

Subsequently, the work item determining unit 130 shifts focus to the parent component of the block component to be processed. The parent component corresponds to the component including the component corresponding to the block component to be processed. The work item determining unit 130 checks the WBS registration completion flag property of the stereotype <<patternApplied>> of each of all the child components which belongs to the focused parent component (the child components being the components each having the same parent component as that of the block component to be processed). Then, the work item determining unit 130 extracts a component group in which the property values of all the child components are set to "True" (hereinafter, such a component group is referred to as an already-registered component group) (step 709).

Thereafter, the work item determining unit 130 extracts a constraint component and a connector component which are positioned between the components in the extracted already-registered component group (step 710), and then returns to the processing in step 703 while the extracted components are to be used as new components to be processed. Hereinafter, the constraint component and connector component which couple block components are, in combination, called a coupling component.

The work item determining unit 130 sets the name of the new component to be processed (coupling component) into the section for the related component name in the WBS (step 703). Then, the work item determining unit 130 determines whether or not the component is a block component (step 704). In this example, since the coupling component extracted in step 710 is to be processed, the component is determined not to be a block component.

In the case where the component is determined not to be a block component in step 704, the work item determining unit 130 next sets the names (block names) of the block components which are positioned in the ends of the coupling component to be processed (such block components being referred to as related block components, hereinafter), into the sections for the middle level item names in the WBS (step 711). Then, the work item determining unit 130 sets the reference value in the sections for the middle level item sequence numbers (step 712). Here, the reference value, which is set to 1 in step 702, is incremented by one in step 707, and hence 2 is entered into each of the sections for the middle level item sequence numbers.

Subsequently, the work item determining unit 130 increments the reference value by one (step 713), and then sets, to "True," the property value of the WBS registration completion flag of the stereotype <<patternApplied>> of the parent component (hereinbelow, referred to as component A) of the related block components whose names are set in step 711 (step 714). Through the processes from step 711 to step 714, the registration of the information on the middle level items are completed for the component which includes the components corresponding to the related block components coupled through the coupling component to be processed (that is, for the component corresponding to component A).

Thereafter, the work item determining unit 130 determines whether or not component A is a block component positioned in the highest level (root node) in the block definition diagram (step 715). If component A is the block component in the highest level, it means that the registration of the information on the middle level items in the WBS is completed for the entire configuration of the target system. Accordingly, the process performed by the work item determining unit 130 is terminated. On the other hand, if component A is not the block component in the highest level, it means that there are components whose information has not been registered as middle level items in the WBS. Accordingly, the processing performed by the work item determining unit 130 is continued.

In the case where component A is not the block component in the highest level, the work item determining unit 130 shifts the focus to the parent component of component A. Subsequently, the work item determining unit 130 checks the WBS registration completion flag property of the stereotype <<patternApplied>> for each of the child components of the focused parent component (i.e. for each of the components having the same parent component as that of component A), and then extracts an already-registered component group in which the property values of all the child components are set to "True" (step 716).

Thereafter, the work item determining unit 130 extracts the coupling component which is positioned between the components of the extracted already-registered component group (the coupling component being a constraint component and a connector component) (step 717), and then returns to the processing in step 703 while the extracted components may be used as new components to be processed. The above-described processing is repeated until component A is determined to be the block component in the highest level in step 715.

Figure 8:
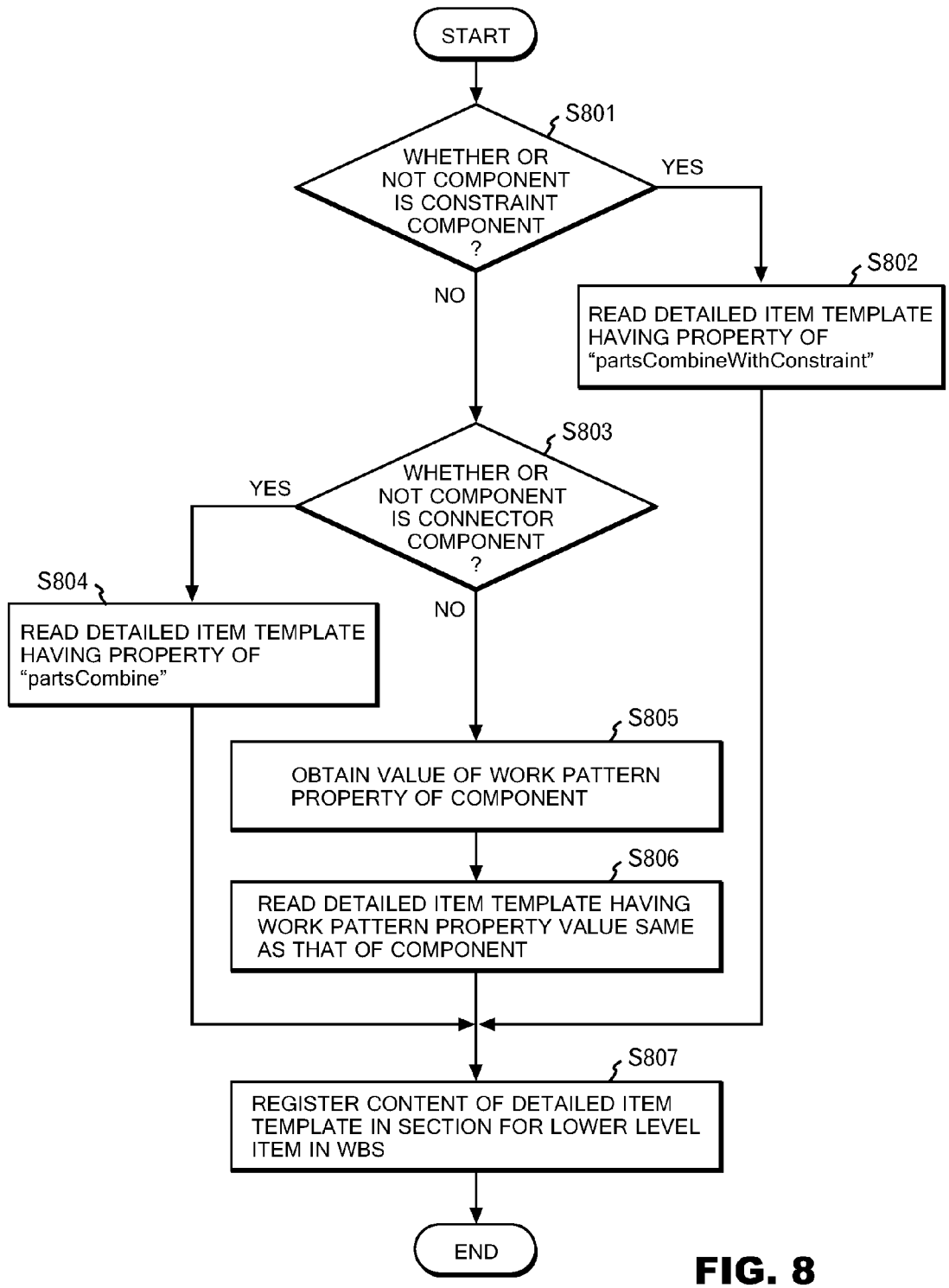
FIG. 8 is a flowchart showing details of processing shown in FIG. 6 performed by a detailed item determining unit.

FIG. 8 is a flowchart showing the details of the processing in step 605 shown in FIG. 6 performed by the detailed item determining unit 140.

The detailed item determining unit 140 sequentially focuses on each work item in the WBS in which the information on the middle level items are registered by the work item determining unit 130, and performs the following processing.

As shown in FIG. 8, the detailed item determining unit 140 first checks the kind of the component on the basis of the component name registered in the section for the related component name for the target work item (steps 801 and 803).

If the component is a constraint component (Constraint) (Yes in step 801), the detailed item determining unit 140 reads, from the detailed item template storage 400, a detailed item template in which the work pattern is set to be "partsCombineWithConstraint" (step 802). Then, the detailed item determining unit 140 sets the content of the detailed item included in the read detailed item template, into the relevant sections for the lower level items in the WBS (step 807).

If the component is a connector component (Connector) (Yes in step 803), the detailed item determining unit 140 reads, from the detailed item template storage 400, a detailed item template in which the work pattern is set to be "partsCombine" (step 804). Then, the detailed item determining unit 140 sets the content of the detailed item included in the read detailed item template, into the relevant sections for the lower level items in the WBS (step 807).

If the target component is neither a constraint component (Constraint) nor a connector component (Connector) (No in both steps 801 and 803), the detailed item determining unit 140 refers to the block definition diagram of the structure model. Then, the detailed item determining unit 140 obtains the property value of the work pattern of the stereotype <<patternApplied>> for the target work item component (step 805). Consequently, a value, e.g., "Software," "Mechanical" or "Electric," may be obtained as the property value.

Subsequently, the detailed item determining unit 140 reads, from the detailed item template storage 400, a detailed item template which has the same work pattern property value as that obtained in step 805 (step 806). Then, the detailed item determining unit 140 sets the content of the detailed item included in the read detailed item template, into the relevant sections for the lower level items in the WBS (step 807).

Figure 9:
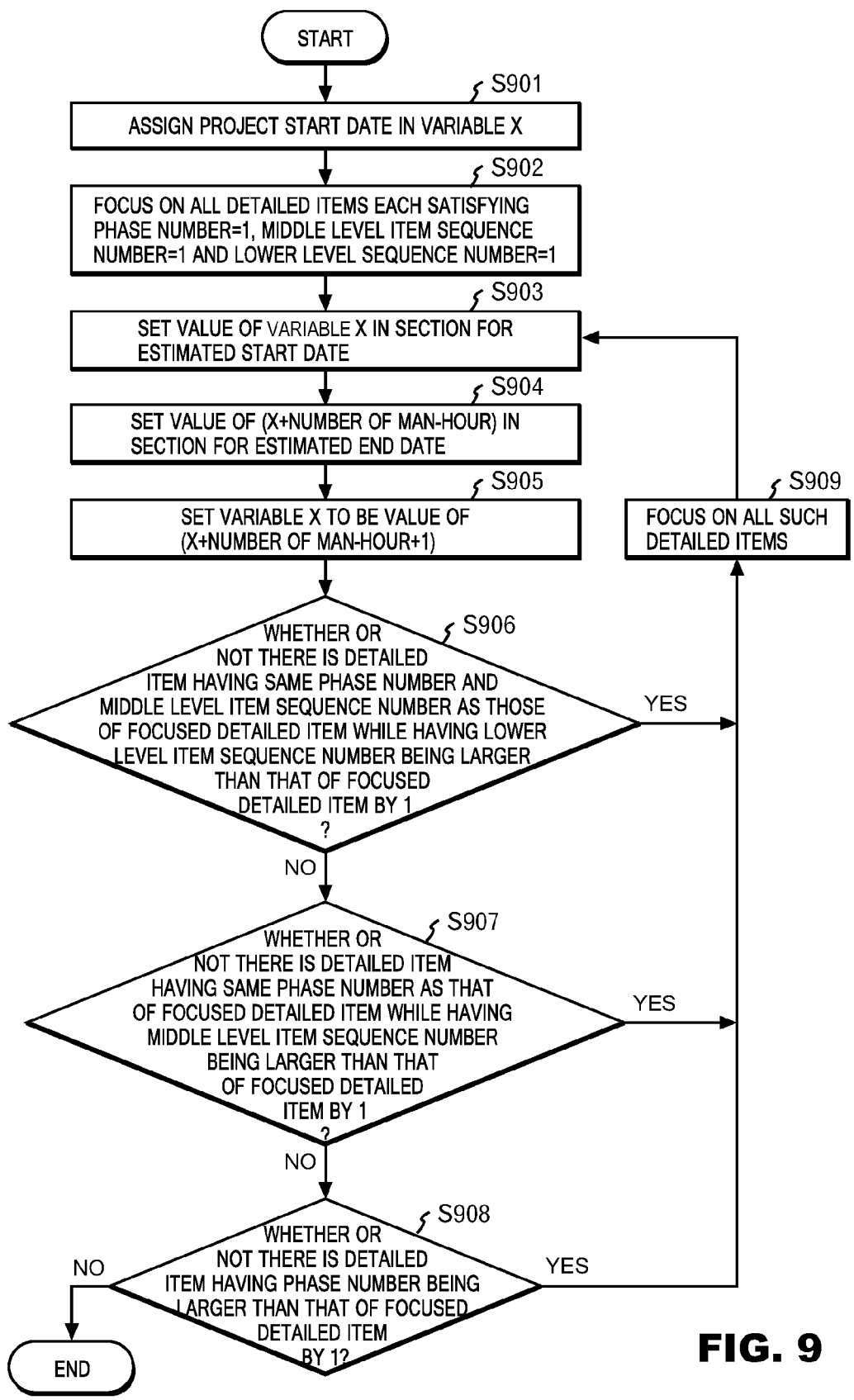
FIG. 9 is a flowchart showing details of processing shown in FIG. 6 performed by a date scheduling unit.

FIG. 9 is a flowchart showing the details of the processing in step 606 shown in FIG. 6 performed by the date scheduling unit 150.

As shown in FIG. 9, the date scheduling unit 150 obtains the start date of the project set in step 601 of FIG. 6, and then substitutes the obtained start date for a temporarily defined variable X (step 901). Thereafter, the date scheduling unit 150 focuses on, as the item to be processed, each detailed item having 1 as the phase number, 1 as the middle level item sequence number, and 1 as the lower level item sequence number in the WBS (step 902).

Subsequently, the date scheduling unit 150 sets the value of the variable X (date) in the section for estimated start date in the WBS for each of the detailed items focused in step 902 (step 903). In addition, the date scheduling unit 150 sets the value of (X+number of man-hour) (date) in the section for estimated end date in the WBS for each of the above-described detailed items (step 904). Then, the date scheduling unit 150 sets (X+number of man-hour+1) as the new value of the variable X (step 905).

Next, the date scheduling unit 150 performs the following check on the detailed item in the WBS which has not been focused yet.

The date scheduling unit 150 first checks whether or not there is a detailed item having the same phase number and middle level item sequence number as those of the detailed item focused in step 902 while having the lower level item sequence number which is larger than that of the detailed item focused in step 902 by one (step 906). If there are such detailed items, the date scheduling unit 150 focuses on all the detailed items as the items to be processed (step 909), and returns the processing to step 903.

If there is no detailed item satisfying the above condition in step 906, the date scheduling unit 150 next checks whether or not there are detailed items each having the same phase number as that of the detailed items focused in step 902 while having the middle level item sequence number which is larger than that of the detailed items focused in step 902 by one (step 907). If there are such detailed items, the date scheduling unit 150 focuses on all the detailed items as the items to be processed (step 909), and returns the processing to step 903.

If there is no detailed item satisfying the above condition in step 907, the date scheduling unit 150 further checks whether or not there are detailed items each having the phase number larger than that of the detailed items focused in step 902 by one (step 908). If there are such detailed items, the date scheduling unit 150 focuses on all the detailed items as the items to be processed (step 909), and returns the processing to step 903.

If no detailed item satisfying the corresponding condition is found in each of the steps 906, 907 and 908, it means that the estimated start dates and the estimated end dates are set for all the detailed items. Accordingly, the date scheduling unit 150 terminates the process.

Specific Example of Generating WBS

Next, a specific example of a process for generating a WBS will be described on the basis of a specific example of a target system.

Figure 10:
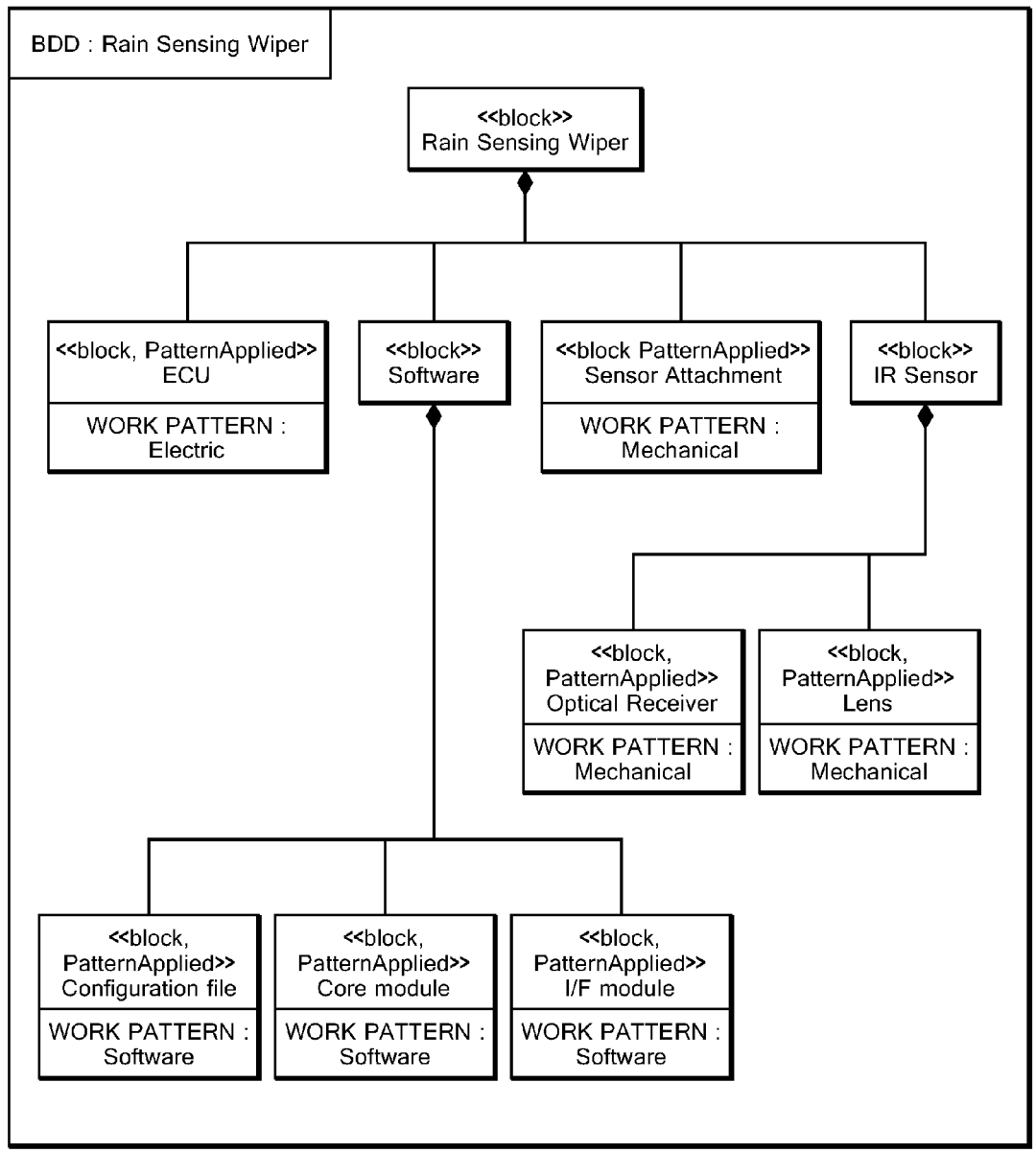
FIG. 10 is a block definition diagram showing a configuration example of a rain sensing wiper which is a target system.

FIG. 10 is a block definition diagram showing a configuration example of a target system.

The target system shown in FIG. 10 is a rain sensing wiper which automatically operates when sensing rain. As shown in FIG. 10, the rain sensing wiper includes: an electronic control unit (ECU); software for control; an infrared (IR) sensor; and a sensor attachment. The software includes: a configuration file; a core module; and an interface (I/F) module. The IR sensor includes an optical receiver and a lens. The hierarchy of the tree structure shown in FIG. 10 illustrates inclusion relationships between the components. Here, assume that the work pattern property of each of the sensor attachment, the optical receiver, and the lens is set to "Mechanical," that the work pattern property of the ECU is set to "Electric," and that the work pattern property of each of the configuration file, the core module, and the I/F module is set to "Software."

Next, coupling relationships between the components of the rain sensing wiper shown in FIG. 10 will be described.

Figure 11:
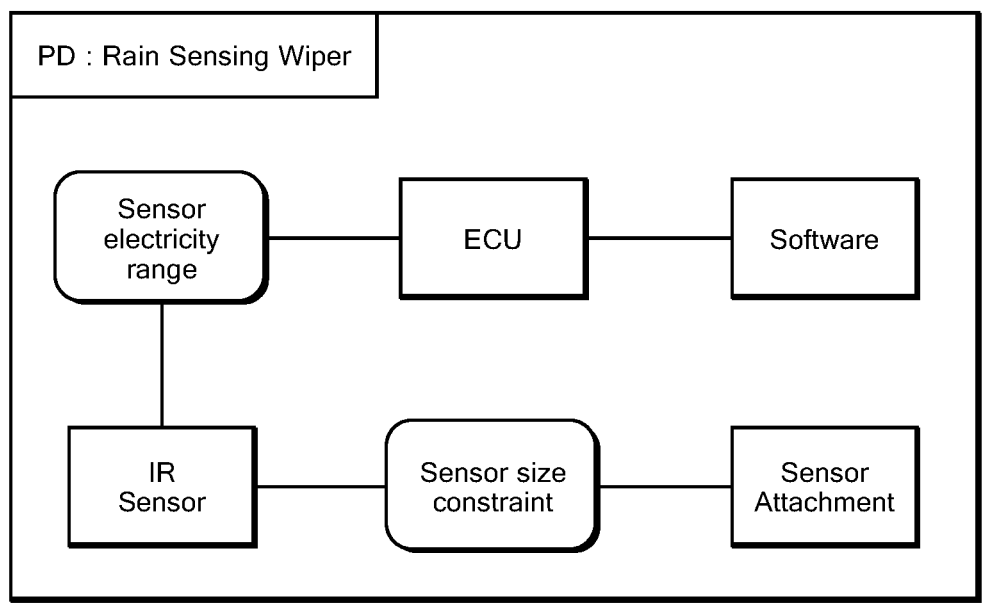
FIG. 11 is a parametric diagram showing coupling relationships between components of the rain sensing wiper.

FIG. 11 is a parametric diagram showing the coupling relationships between the components of the rain sensing wiper.

As shown in FIG. 11, a constraint on the physical size of the sensor is applied between the IR sensor and the sensor attachment. Moreover, a constraint on the electricity range of the sensor is applied between the ECU and the IR sensor. Although the software operates with the ECU (specifically, the software controls the ECU), no constraint is applied therebetween.

Figure 12:
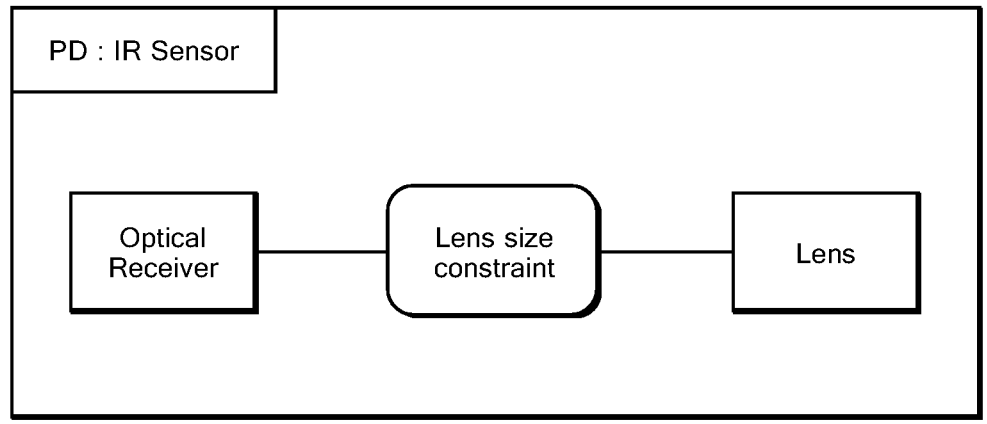
FIG. 12 is a parametric diagram showing a coupling relationship between the components of an infrared sensor.

FIG. 12 is a parametric diagram showing the coupling relationship between the components of the IR sensor.

As shown in FIG. 12, a constraint on the physical size of the lens is applied between the optical receiver and the lens.

Figure 13:
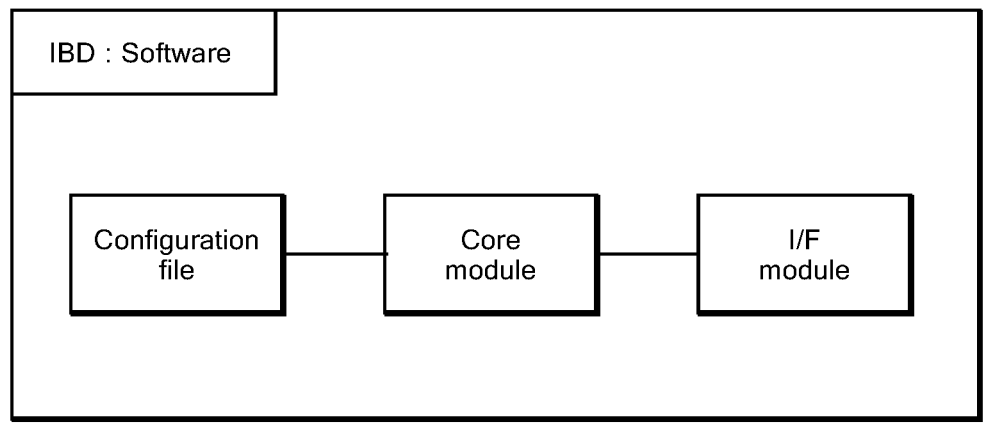
FIG. 13 is an internal block diagram showing coupling relationships between the components of software.

FIG. 13 is an internal block diagram showing the coupling relationship between the components of the software.

As shown in FIG. 13, although there is a relationship between the core module and the configuration file (specifically, a relationship that the core module reads the configuration file), no constraint is applied therebetween, in this example. Moreover, although there is a relationship between the core module and the I/F module (specifically, a relationship that the information in the core module is transmitted to the I/F module), no constraint is applied therebetween, in this example.

Next, examples of a phase template and detailed item templates will be described.

FIG. 14 is a table showing a phase template.

According to FIG. 14, the project for developing the rain sensing wiper includes three phases, which are detail design, prototype development and prototype test, and the project progresses through these phases in this order.

The tables in FIG. 15 each show a detailed item template in the detail design phase, the tables in FIG. 16 each show a detailed item template in the prototype development phase, and the tables in FIG. 17 each show a detailed item template in the prototype test phase.

As shown in FIGS. 15 to 17, a detailed item template is prepared for each of the five types of work patterns, which may be, for example, "Software," "Mechanical," "Electric," "partsCombine" and "partsCombineWithConstraint," in each phase.

Next, a specific procedure for generating a WBS for the above-described project of developing the rain sensing wiper will be described.

Figure 18:
FIG. 18 is a table showing a state in which information included in the phase template is set in a WBS.

First, the phase generating unit 110 reads the phase template shown in FIG. 14, and then sets the information into the relevant sections in the WBS. In addition, the phase generating unit 110 accepts the registration of the start date of the project. In this example, assume that the project start date is 20 May 2007. FIG. 18 is a table showing the state that the information of the phase template is set in the WBS.

Figure 19:
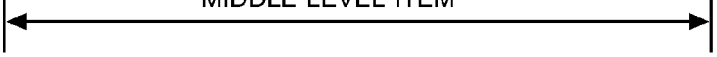
FIG. 19 is a table showing a state of the WBS into which information on middle level items is set in a first processing cycle.

Subsequently, the structure information obtaining unit 120 reads the structure model shown in FIGS. 10 to 13, and then, the work item determining unit 130 sets the information into the relevant sections for the middle level items in the WBS. Specifically, the work item determining unit 130 first extracts block components of the leaf nodes in the block definition diagram shown in FIG. 10, sets the value of the middle level item sequence number to be 1, and then sets the information into the WBS. FIG. 19 is a table showing the state of the WBS at this point. In the block definition diagram shown in FIG. 10, the configuration file, the core module, the I/F module, the optical receiver, the lens, the ECU and the sensor attachment each correspond to a leaf node, and thus, information on these components may be set in the WBS shown in FIG. 19.

Thereafter, the work item determining unit 130 extracts coupling relationships between the block components from each of the already-registered component groups. Then, the work item determining unit 130 sets the value of the middle level item sequence number to be 2, and sets the information in the WBS. The component group including the configuration file, the core module and the I/F module, and the component group including the optical receiver and the lens shown in the block definition diagram of FIG. 10 are already-registered component groups. Accordingly, as shown in FIG. 19, for the former component group, information is set in the WBS on the basis of the internal block diagram shown in FIG. 13, and for the latter component group, information is set in the WBS on the basis of the parametric diagram shown in FIG. 12. FIG. 20 is a table showing the state of the WBS at this point. In each of FIGS. 20 to 22, the contents of the prototype development phase and the prototype test phase are omitted and only the content of the detail design phase will be shown, since the WBS becomes too large in size otherwise.

Subsequently, the work item determining unit 130 extracts coupling components between the block components from the component groups which are now already-registered component groups after the above-described processing cycle. Then, the work item determining unit 130 sets the value of the middle level item sequence number to be 3, and sets the information in the WBS. As shown in FIG. 20, the information is set for the component group including the configuration file, the core module and the I/F module and the component group including the optical receiver and the lens shown in the block definition diagram of FIG. 10. In view of this, the component group including the ECU, the software, the sensor attachment and the IR sensor is a new already-registered component group. Accordingly, for this component group, information is set in the WBS on the basis of the parametric diagram shown in FIG. 11. FIG. 21 is a table showing the state of the WBS at this point.

Next, the detailed item determining unit 140 reads detailed item templates having work patterns corresponding to the kinds of the components, and then sets the information in the WBS. Thereafter, the date scheduling unit 150 calculates an estimated start date and an estimated end date, for each of the detailed items, and then sets the calculated dates in the WBS. FIG. 22 is a table showing the state of the WBS at this point.

Hereinabove, the description has been given of the embodiment. Note, however, that the technical scope of the present invention is not limited to the scope described in the above embodiment. For example, the structure model of the target system may be described by using SysML in the above embodiment. However, the structure model is not limited to the one described in SysML, and may be described in any code as long as information on the components of the target system, information on the dependency relationships between the components are included and the inclusion relationships, the coupling relationships without any constraints and the coupling relationships with constraints are defined as the dependency relationship in the structure model. Moreover, in the above embodiment, the WBS is generated for the project which is the target of the schedule management. However, the data structure which manages information on such as the work items of the project, the work execution sequence numbers and the numbers of man-hours need not be limited to the WBS.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A computer-implemented system for operating a computer processor to schedule management for a project comprising:
    a structure information obtaining unit configured to obtain structure information containing both information on general components including parent or child components to be developed in the project and information on dependency relationships between the general components, the information on dependency relationships containing at least an inclusion relationship and a coupling relationship including a plurality of the parent components with at least one child component; and
    a management unit configured to determine work items and a work execution order on the basis of the structure information obtained by the structure information obtaining unit, and for managing the determined work items and work execution order as work schedule definition information;
    a detailed item determining unit configured to read detailed item templates corresponding to work patterns of the general components from a detailed item storage unit, on the basis of work pattern properties received from the structure information obtaining unit, and to register the contents of each of the read detailed item templates in a work breakdown structure,
    wherein the management unit is configured to extract a group of previously registered ones of the general components that is less than all of the previously registered components, match each of a plurality of the general components in the extracted group with at least one of the previously registered components, and extract a further group of the previously registered components until all of the general components to be developed in the project are registered,
    wherein in response to one of the general components being neither a connector component nor a constraint component, a model diagram including the structure information is referenced to determine a value of the one of the general components;
    wherein the management unit is configured to divide the work items into a plurality of sequenced phases for executing the work items, wherein the plurality of sequenced phases are work stages for executing the work items,
wherein the management unit is configured to determine one of the work items related to a leaf component, which is a general component not including any other general component, and to determine, in a case where all of a plurality of the general components included in a single predetermined general component are the leaf components, one of the work items related to a coupling relationship between the leaf components,
    wherein the management unit is configured to store a plurality of sequence numbers for each of a plurality of levels of information regarding the work items, and
    wherein the work execution order is determined by cycling through the plurality of levels of information regarding the work items in ascending level order and the plurality of sequenced phases in ascending phase order and referencing a time required to complete the work items.

2. The system according to claim 1 wherein the management unit determines a work item related to a coupling relationship between a plurality of the general components included in the single predetermined general component, in a case where part of or all of the plurality of general components include a general component for which a work item related to a coupling relationship is determined and where no general component that includes a general component for which a work item related to a coupling relationship is not determined is included in the plurality of general components.

3. The system according to claim 2 wherein the management unit repeats the determination of the work item related to the coupling relationship between the plurality of general components until the determination of the work item is completed for the coupling relationships of all the general components for which each is included in another general component.

4. The system according to claim 1, wherein the structure information obtained by the structure information obtaining unit includes a coupling relationship with a constraint and a coupling relationship without any constraint as the coupling relationships of the information on dependency relationships.

5. The system according to claim 4, wherein
    the structure information obtained by the structure information obtaining unit is described in SysML, and,
    in the information on dependency relationships, the inclusion relationship is described in the form of a block definition diagram, the coupling relationship with a constraint is described in the form of an internal block diagram, and the coupling relationship without any constraint is described in the form of a parametric diagram.

6. The system according to claim 1 wherein the management unit generates the definition information by registering information on the determined work items in a data structure having, as registration items, at least the work items, the general components related to the work items and the work execution order.

7. The system according to claim 6, further comprising a definition information obtaining unit which obtains detailed definition information defining detailed work items to be executed depending on the kinds of the general components and the kinds of the coupling relationships between the general components, wherein
    on the basis of the information on the work items and the general components registered in the data structure, the management unit registers the corresponding detailed definition information in the data structure.

8. A method of managing a schedule of a project, the method:
    obtaining structure information, using a computer processor, containing both information on general components to be developed in the project and information on dependency relationships between the general components, the information on dependency relationships containing at least an inclusion relationship and a coupling relationship,
    determining a work item among a plurality of work items related to a plurality of leaf components, wherein each of the plurality of leaf components is a general component not including any other general component;
    extracting all of the plurality of leaf components;
    determining, in a case where all of a plurality of the general components included in a single predetermined general component are one of the plurality of leaf components, one of the plurality of work items related to a coupling relationship between the plurality of leaf components;
    if one of the plurality of general components is neither a connector component nor a constraint component, then determining a value of one of the plurality of general components by referencing a model diagram including the structure information; and registering information on the determined work item related to one of the plurality of leaf components and the determined work item related to a coupling relationship between the plurality of leaf components in a data structure having, as registration items at least the plurality of work items, the general components related to the plurality of work items, a plurality of work phases, and the work execution order, wherein each of the plurality of work items includes a plurality of sequence numbers for each of a plurality of levels of information regarding the work item, such that content of a phase template is registered for each phase of the plurality of work phases after selection of the phase template by the user, wherein the method initially registers the plurality of leaf components, and subsequently registers the plurality of general components by matching a first previously registered component with a coupling relationship between the first previously registered component and a second previously registered component, among a plurality of previously registered ones of the general components, wherein the method includes extracting a group of the previously registered ones of the general components that is less than all of the plurality of previously registered ones of the general components, matching each of a plurality of the general components in the extracted group with at least one of the previously registered ones of the general components, and extract a further group of the previously registered ones of the general components until all of the general components to be developed in the project are registered.

9. The method according to claim 8, further comprising a step of determining a work item related to a coupling relationship between a plurality of the general components included in the single predetermined component, in a case where part of or all of the plurality of general components are general components each of which includes a general component for which a work item related to a coupling relationship is determined and where no general component that includes a general component for which a work item related to a coupling relationship is not determined is included in the plurality of general components.

10. The method according to claim 9, wherein the step of determining the work item related to a coupling relationship between the plurality of general components is repeated until the determination of the work item is completed for the coupling relationships of all the general components for which each is included in another general component.

11. The method according to claim 8, further comprising the steps of:
obtaining detailed definition information defining detailed work items to be executed depending on the kinds of the general components and the kinds of the coupling relationships between the general components; and
on the basis of the information on the work items to be executed and the general components registered in the data structure, registering the corresponding detailed definition information in the data structure.

12. A computer readable program stored on a non-transitory computer readable medium including computer readable program code configured to cause a computer to function as:
structure information obtaining means for obtaining structure information containing both information on general components to be developed in a project and information on dependency relationships between the general components, including a plurality of parent components which each have at least one child component, the information on dependency relationships containing at least an inclusion relationship and a coupling relationship;
management means for determining a work item among a plurality of work items and a work execution order on the basis of the structure information obtained by the structure information obtaining means, and for managing the determined work item and work execution order as work schedule definition information, wherein functions of the management means are to cause the computer to execute processing to:
determine a work item among the plurality of work items related to a leaf component, which is a general component not including any other general component; and to
determine, in a case where all of a plurality of general components included in a single predetermined general component are the leaf components, a work item related to a coupling relationship between the leaf components, and
registering means for registering the general components to be developed in the project, wherein the registering means initially registers the leaf components, and subsequently registers the general components to be developed in the project by
extracting a group of previously registered components that is less than all of the previously registered components;
matching means for matching each of a plurality of general components in the extracted group with at least one of the previously registered components; and
extracting means for extracting a further group of the previously registered components until all of the general components to be developed in the project are registered,
wherein an item template including work item names for identifying the plurality of work items, number of man-hours, and work sequence numbers showing the execution sequence of the work item is created for the work item related to a coupling relationship between the leaf components,
wherein a different instance of the item template is created for each of the plurality of work items during each of a plurality of work phases and for each type of work, and
wherein in response to one of the plurality of components being neither a connector component nor a constraint component, determining a value of one of the plurality of general components by referencing a model diagram including the structure information.

13. The program according to claim 12, wherein a function of the management means is to cause the computer to execute processing to determine a work item related to a coupling relationship between the plurality of general components included in the single predetermined general component, in a case where part of or all of the plurality of general components are general components each of which includes a general component for which a work item related to a coupling relationship is determined and where no general component that includes a general component for which a work item related to a coupling relationship is not determined is included in the plurality of general components.

14. The program according to claim 13, wherein a function of the management means is to cause the computer to execute processing to repeat the determination of the work item related to a coupling relationship between the plurality of general components until the determination of the work item is completed for the coupling relationships of all the general components for which each is included in another general component.

15. A computer program product, the computer program product comprising a computer useable medium including a computer readable program, wherein the computer readable program when executed on a computer causes the computer to:
- obtain structure information containing both information on general components to be developed in a project and information on dependency relationships between the general components, the information on dependency relationships containing at least an inclusion relationship and a coupling relationship;
- determine a work item related to a plurality of leaf components, wherein each of the plurality of leaf components is a general component not including any other general component;
- extract all of a plurality of leaf components;
- determine, in a case where all of a plurality of general components included in a single predetermined general component are the leaf components, a work item related to a coupling relationship between the leaf components;
- read detailed item templates corresponding to work patterns of the general components from a detailed item storage unit, on the basis of work pattern properties received from the obtained structure information, and register the contents of each of the read detailed item templates;
- register information on the determined work items in a data structure having, as registration items, at least the work items, the general components related to the work items and the work execution order, and a table that includes a plurality of sequenced phases for scheduling work of the work items and includes a plurality of sequence numbers for each of a plurality of levels of information regarding the work items;
- extract a group of previously registered ones of the general components that is less than all of previously registered ones of the general components, match each of a plurality of the general components in the extracted group with at least one of the previously registered ones of the general components, and extract a further group of the previously registered ones of the general components until all of the general components to be developed in the project are registered,
- store a registration completion flag for each of the work items containing a status indicator of whether registration is complete for each of the work items; and
- if one of the plurality of general components is neither a connector component nor a constraint component, determine a value of one of the plurality of general components by referencing a model diagram including the structure information,
- wherein more than one of the plurality of general components are assigned the same sequence number.

16. The computer program product according to claim 15, the computer readable program causing the computer to further execute processing to determine a work item related to a coupling relationship between the plurality of general components included in the single predetermined general component, in a case where part of or all of the plurality of general components are general components each of which includes a general component for which a work item related to a coupling relationship is determined and where no general component that includes a general component for which a work item related to a coupling relationship is not determined is included in the plurality of general components.

17. The computer program product according to claim 15, the program being for causing the computer to further execute:
- processing to obtain detailed definition information defining detailed work items to be executed depending on the kinds of the general components and the kinds of the coupling relationships between the general components; and
- on the basis of the information on the work items and the general components registered in the data structure, processing to register the corresponding detailed definition information in the data structure.

* * * * *